(12) United States Patent
Dunlap et al.

(10) Patent No.: US 11,005,137 B2
(45) Date of Patent: May 11, 2021

(54) ELECTRIFIED VEHICLE BATTERY PACK TO VEHICLE BODY ATTACHMENT AND SEALING STRATEGIES

(71) Applicant: FORD GLOBAL TECHNOLOGIES, LLC, Dearborn, MI (US)

(72) Inventors: Brock Dunlap, Dearborn, MI (US); Kevin A. Montgomery, Royal Oak, MI (US); Hari Krishna Addanki, Novi, MI (US); Michael E. Reibling, Sterling Heights, MI (US); Sam Jeffrey Tomlinson, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 16/539,451

(22) Filed: Aug. 13, 2019

(65) Prior Publication Data
US 2021/0050570 A1    Feb. 18, 2021

(51) Int. Cl.
| | |
|---|---|
| *B60K 1/04* | (2019.01) |
| *H01M 50/20* | (2021.01) |
| *B60L 50/60* | (2019.01) |
| *B62D 25/20* | (2006.01) |

(52) U.S. Cl.
CPC .............. *H01M 50/20* (2021.01); *B60K 1/04* (2013.01); *B60L 50/66* (2019.02); *B62D 25/20* (2013.01); *B60K 2001/0438* (2013.01); *B60Y 2200/91* (2013.01); *B60Y 2200/92* (2013.01); *H01M 2220/20* (2013.01)

(58) Field of Classification Search
CPC ... B60K 1/04; B60K 2001/9438; B60L 50/60; B62D 25/20; H01M 2220/20
See application file for complete search history.

(56) References Cited

U.S. PATENT DOCUMENTS

| | | | |
|---|---|---|---|
| 9,722,223 B1* | 8/2017 | Maguire | B60K 1/04 |
| 9,960,391 B2 | 5/2018 | Nakamori et al. | |
| 10,069,123 B2 | 9/2018 | Maguire | |
| 2015/0151624 A1* | 6/2015 | Yamada | B60K 1/04 |
| | | | 180/68.5 |
| 2017/0214013 A1 | 7/2017 | Benedict et al. | |

FOREIGN PATENT DOCUMENTS

| | | |
|---|---|---|
| JP | 2019021473 A | 2/2019 |
| WO | 2015/019742 A1 | 2/2015 |

* cited by examiner

*Primary Examiner* — James A Shriver, II
*Assistant Examiner* — James J Triggs
(74) *Attorney, Agent, or Firm* — David B. Kelley; Carlson, Gaskey & Olds

(57) ABSTRACT

This disclosure details electrified vehicles that are equipped with one or more attachment and sealing assemblies for securing a battery pack to the vehicle. An exemplary attachment and sealing assembly may establish a mid-span attachment point of the battery pack and may include a pass-through component, a fastener, and a seal. The fastener may be positioned relative to the pass-through component using either a bottom-up or top-down approach. The seal may radially seal between a portion of a battery pack enclosure assembly and the pass-through component.

20 Claims, 4 Drawing Sheets

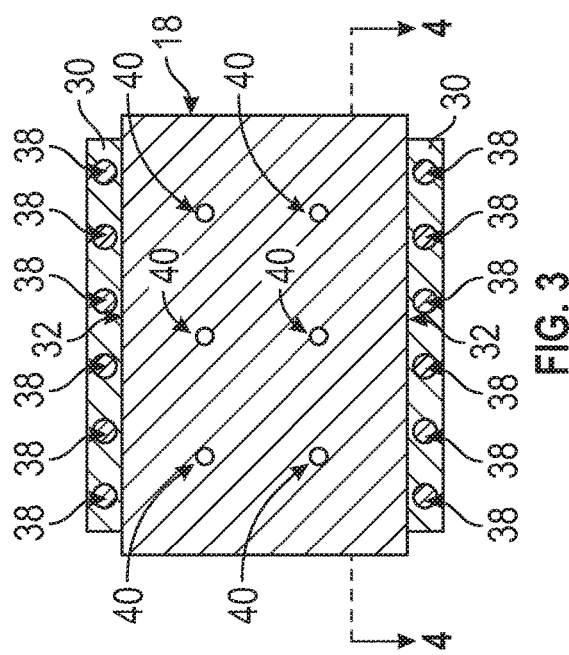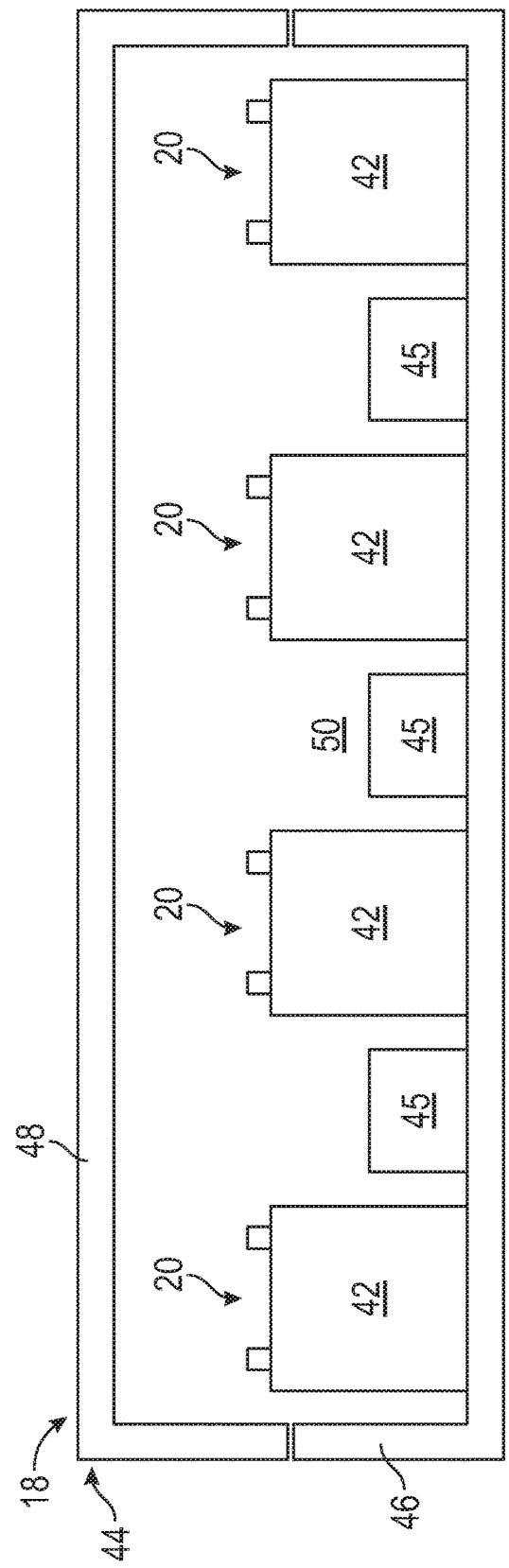

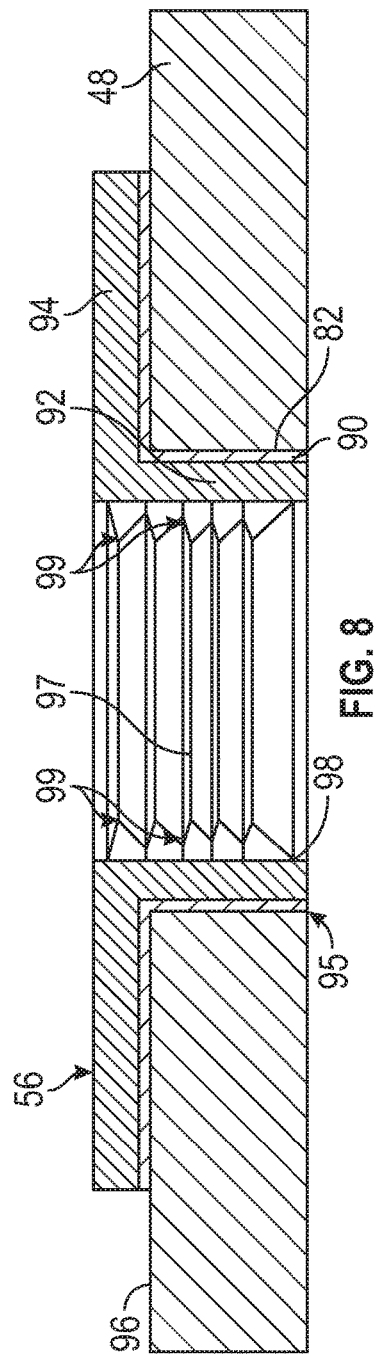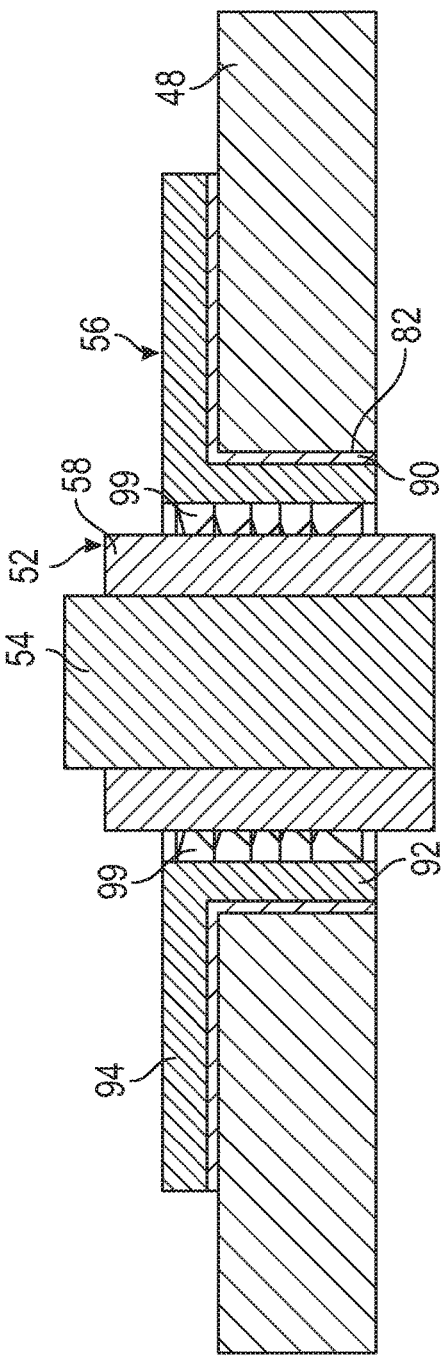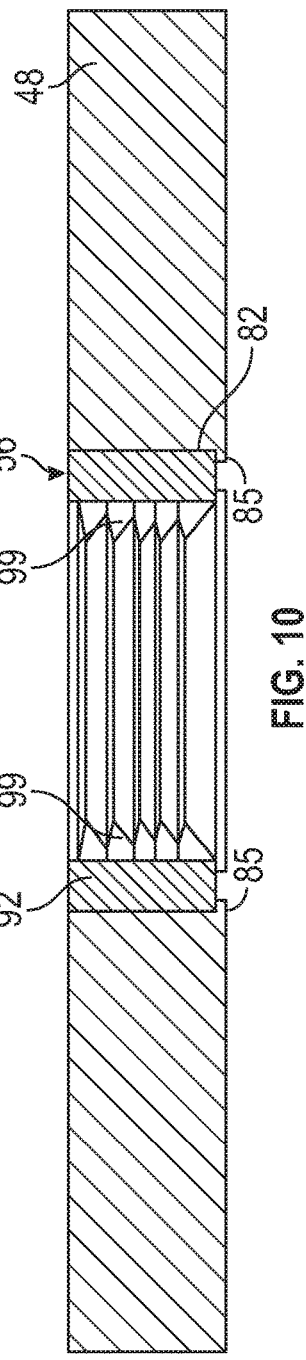

ELECTRIFIED VEHICLE BATTERY PACK TO VEHICLE BODY ATTACHMENT AND SEALING STRATEGIES

TECHNICAL FIELD

This disclosure relates to attachment and sealing assemblies that establish mid-span attachment points for mounting battery packs to electrified vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A traction battery pack typically powers the electric machines and other electrical loads of the electrified vehicle. The traction battery pack includes a plurality of energy storage devices, such as battery cells, that store energy for powering these electrical loads. The battery cells and various other battery components are typically packaged together inside an enclosure assembly. The enclosure assembly typically provides one or more attachment points for mounting the battery pack to the electrified vehicle.

SUMMARY

A battery pack according to an exemplary aspect of the present disclosure includes, among other things, an enclosure assembly, a battery array housed inside the enclosure assembly, and a battery internal structure adjacent to the battery array. An attachment and sealing assembly include a pass-through component extending at least partially through the battery internal structure and through a portion of the enclosure assembly, a fastener received by the pass-through component, and a seal arranged between the pass-through component and the portion of the enclosure assembly.

In a further non-limiting embodiment of the foregoing battery pack, the attachment and sealing assembly establishes a mid-span attachment point of the battery pack.

In a further non-limiting embodiment of either of the foregoing battery packs, an attachment assembly establishes a peripheral attachment point of the battery pack.

In a further non-limiting embodiment of any of the foregoing battery packs, the pass-through component extends through a bottom surface of a tray of the enclosure assembly, then through the battery internal structure, and then through a cover of the enclosure assembly.

In a further non-limiting embodiment of any of the foregoing battery packs, a flange of the pass-through component abuts against the bottom surface of the tray and an end of a tube of the pass-through component abuts against an undersurface of the cover.

In a further non-limiting embodiment of any of the foregoing battery packs, the fastener is received through a hollow passage of the tube such that a head of the fastener abuts against the flange of the pass-through component and a stud of the fastener extends through a vehicle body component.

In a further non-limiting embodiment of any of the foregoing battery packs, a nut is secured to an end of the stud.

In a further non-limiting embodiment of any of the foregoing battery packs, a thread of the fastener is received by a threaded portion of the pass-through component.

In a further non-limiting embodiment of any of the foregoing battery packs, a head of the fastener is received against a vehicle body component.

In a further non-limiting embodiment of any of the foregoing battery packs, the pass-through component includes a tube that extends through a cover of the enclosure assembly and a threaded stanchion that extends into the battery internal structure.

In a further non-limiting embodiment of any of the foregoing battery packs, a thread of the fastener engages a threaded portion of the tube.

In a further non-limiting embodiment of any of the foregoing battery packs, the seal includes a passage and an inner diameter wall that circumscribes the passage. At least one lip or wiper protrudes inwardly from the inner diameter wall and radially seals to the pass-through component.

An electrified vehicle according to another exemplary aspect of the present disclosure includes, among other things, a vehicle body component, a battery pack mounted to the vehicle body component, and an attachment and sealing assembly that establishes a mid-span connection point for connecting the battery pack to the vehicle body component. The attachment and sealing assembly includes a pass-through component that extends at least partially into a battery internal structure of the battery pack.

In a further non-limiting embodiment of the foregoing electrified vehicle, an attachment assembly establishes a peripheral connection point of the battery pack.

In a further non-limiting embodiment of either of the foregoing electrified vehicles, the pass-through component is a sleeve that includes a tube and a flange.

In a further non-limiting embodiment of any of the foregoing electrified vehicles, the pass-through component includes a tube and a threaded stanchion that is attached to the battery internal structure.

In a further non-limiting embodiment of any of the foregoing electrified vehicles, the battery internal structure is a floor pan or a rail of a vehicle frame.

In a further non-limiting embodiment of any of the foregoing electrified vehicles, the pass-through component extends through a cover of the battery pack.

In a further non-limiting embodiment of any of the foregoing electrified vehicles, a seal radially seals to a tube of the pass-through component.

In a further non-limiting embodiment of any of the foregoing electrified vehicles, a fastener extends at least partially through the pass-through component.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates an exemplary battery pack of an electrified vehicle.

FIG. 4 is a cross-sectional view through section 4-4 of FIG. 3.

FIG. 8 illustrates an exemplary seal of an attachment and sealing assembly for a battery pack.

FIG. 9 illustrates the seal of FIG. 9 in a sealing relationship with a pass-through component of the attachment and sealing assembly.

FIG. 10 illustrates another exemplary seal of an attachment and sealing assembly for a battery pack.

DETAILED DESCRIPTION

This disclosure details electrified vehicles that are equipped with one or more attachment and sealing assemblies for securing a battery pack to the vehicle. An exemplary attachment and sealing assembly may establish a mid-span attachment point of the battery pack and may include a pass-through component, a fastener, and a seal. The fastener may be positioned relative to the pass-through component using either a bottom-up or top-down approach. The seal may radially seal between a portion of a battery pack enclosure assembly and the pass-through component. These and other features are discussed in greater detail in the following paragraphs of this detailed description.

Figure 1:
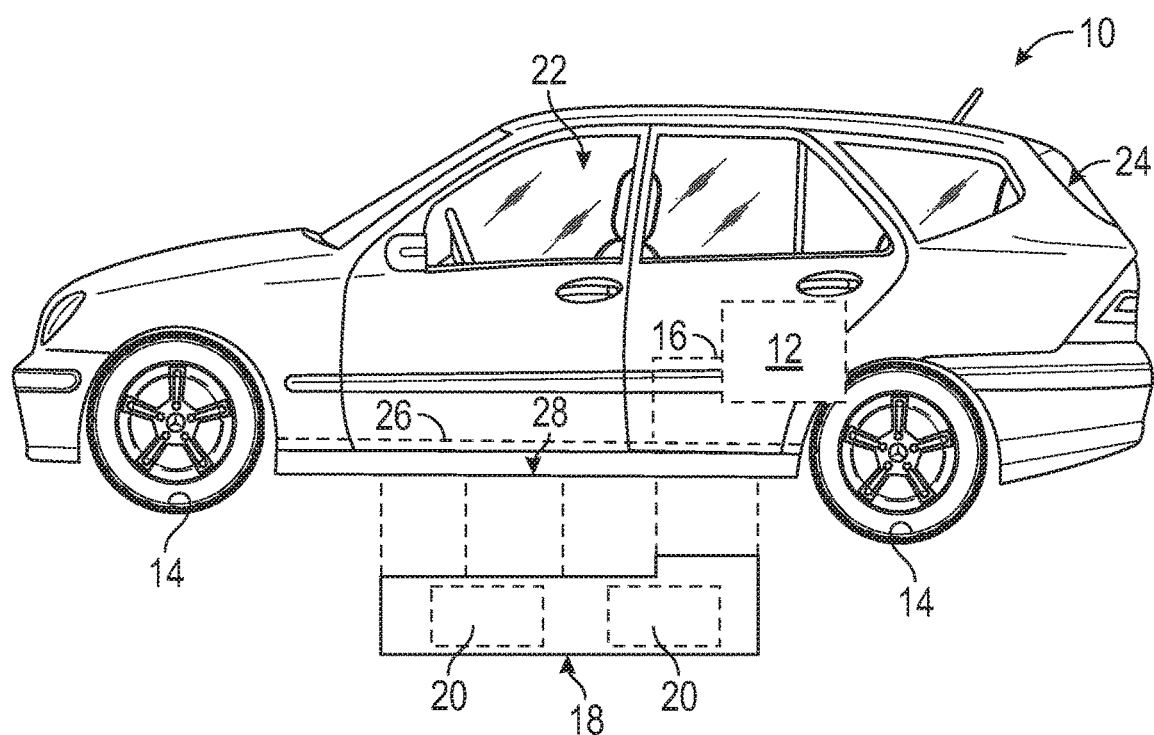
FIG. 1 schematically illustrates an electrified vehicle.
Figure 2:
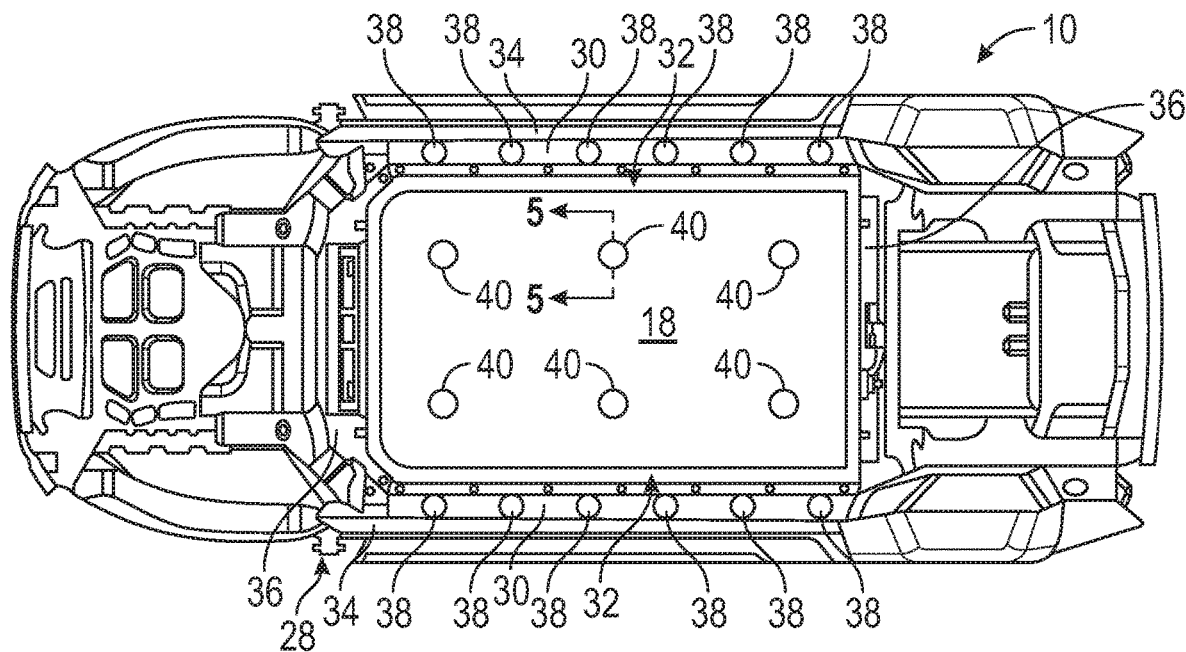
FIG. 2 illustrates an underside of the electrified vehicle of FIG. 1.

FIGS. 1 and 2 schematically illustrate an electrified vehicle 10. The electrified vehicle 10 could be a car, a truck, a van, a sport utility vehicle, a crossover, or any other type of vehicle that includes an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

In the illustrated embodiment, the electrified vehicle 10 is a full electric vehicle propelled solely through electric power, such as via one or more electric machines 12, without any assistance from an internal combustion engine. The electric machine 12 may operate as an electric motor, an electric generator, or both. The electric machine 12 receives electrical power from a battery pack 18 and provides a rotational output torque to one or more drive wheels 14 of the electrified vehicle 10.

A voltage bus 16 electrically connects the electric machine 12 to the battery pack 18. The battery pack 18 is an exemplary electrified vehicle traction battery pack. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 18 may be mounted at various locations of the electrified vehicle 10. In an embodiment, the electrified vehicle 10 includes a passenger cabin 22 and a cargo space 24 (e.g., a trunk) located to the rear of the passenger cabin 22. A floor pan 26 may separate the passenger cabin 22 from a vehicle frame 28, which generally establishes the vehicle underbody. The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle are integrated into one another, or may be part of a body-on-frame construction. The vehicle frame 28 may be made of a metallic material, such as steel, carbon steel, or an aluminum alloy, as non-limiting examples.

The battery pack 18 may be suspended from or otherwise mounted to the vehicle frame 28 such that it is remote from both the passenger cabin 22 and the cargo space 24. The battery pack 18 therefore does not occupy space that would otherwise be available for carrying passengers or cargo.

One or more side rails 30 (see FIGS. 2 and 3) may be used to connect the battery pack 18 to the vehicle frame 28. In an embodiment, one side rail 30 is mounted to each opposing lengthwise side 32 of the battery pack 18. However, other configurations are also contemplated, and thus the total number and mounting locations of the side rails 30 are not intended to limit this disclosure.

The vehicle frame 28 may include a plurality of rails 34 (sometimes referred to as "frame rails" or "beams"). FIG. 2 shows two such rails 34. The rails 34 are spaced apart from one another and extend longitudinally to establish a length of the vehicle frame 28. A plurality of cross members 36 (e.g., two or more) may extend between the rails 34 of the vehicle frame 28. The cross members 36 may generally extend transversely relative to the rails 34 for establishing a width of the vehicle frame 28.

The side rails 30 may be mounted to the rails 34, the cross members 36, or both. In the illustrated embodiment of FIG. 2, one of the side rails 30 is mounted to each of the rails 34.

A plurality of attachment assemblies 38 may be used to mount the battery pack 18 to the side rails 30 and then to mount the side rails 30 to the rails 34 of the vehicle frame 28. The attachment assemblies 38 are located around the periphery of the battery pack 18 and therefore establish peripheral attachment points for securing the battery pack 18 to the vehicle frame 28. The peripheral attachment points generally do not require sealing. Each attachment assembly 38 may include one or more mechanical fasteners, such as rigid bolts or screws. Other types of fasteners could also be used within the scope of this disclosure. The total number of attachment assemblies 38 employed to mount the battery pack at the peripheral attachment points may vary per design and is therefore not intended to limit this disclosure.

Depending on the size of the battery pack 18, the span between the side rails 30 may be relatively large. The large span can affect the durability of the battery pack 18 and the vehicle frame 28 and my influence noise, vibration, and harshness of these components. Therefore, a plurality of attachment and sealing assemblies 40 may additionally be employed for mounting the battery pack 18 relative to the vehicle frame 28. The attachment and sealing assemblies 40 are located inside of the outer periphery of the battery pack 18 and may therefore establish mid-span attachment points for securing the battery pack 18 to the vehicle frame 28. In an embodiment, the attachment and sealing assemblies 40 are located axially between the peripherally located attachment assemblies 38. The total number of attachment and sealing assemblies 40 employed to mount the battery pack 18 at the mid-span attachment points may vary per design and is therefore not intended to limit this disclosure.

Although shown in FIG. 2 as being mounted using both the attachment assemblies 38 and the attachment and sealing assemblies 40, the battery pack 18 could in some embodiments be mounted using only the attachment and sealing assemblies 40.

Due to their mid-span mounting locations, the attachment and sealing assemblies 40 may extend at least partially through sealed areas of the battery pack 18. The attachment and sealing assemblies 40 must therefore be capable of both sealing and securing the battery pack 18 relative to nearby vehicle structures. Various exemplary attachment and sealing assemblies for both sealing holes or openings formed through the battery pack 18 in order to accommodate the attachment and sealing assemblies 40 and for providing a stiffer battery-to-body interface are therefore proposed in this disclosure.

Referring now primarily to FIG. 4, the battery pack 18 may house a plurality of battery cells 42 that store energy for powering various electrical loads of the electrified vehicle 12, such as the electric machine 12 of FIG. 1, for example. In an embodiment, the battery pack 18 houses prismatic, lithium-ion cells. However, battery cells having other geometries (cylindrical, pouch, etc.), other chemistries (nickel-metal hydride, lead-acid, etc.), or both could alternatively be utilized within the scope of this disclosure. Although not shown, the battery pack 18 may additionally house one or more internal electronic components, including but not limited to, a bussed electrical center (BEC), a battery electric control module (BECM), wiring harnesses, wiring, I/O connectors, etc., and a battery thermal management system for thermally managing the battery cells 42.

The battery cells 42 may be grouped together in one or more battery arrays 20. In an embodiment, the battery pack 18 includes four battery arrays 20. However, the total numbers of battery cells 42 and battery arrays 20 employed within the battery pack 18 are not intended to limit this disclosure.

A battery internal structure 45, such as a relatively rigid cross member, may be positioned between each adjacent set of battery arrays 20. In general, the battery internal structures 45 add rigidity to the battery pack 18 and establish mounting points for securing the attachment and sealing assemblies 40 to the battery pack 18.

An enclosure assembly 44 may house each battery array 20 of the battery pack 18. Since the battery arrays 20 and other battery electronic components are housed inside the enclosure assembly 44, these components are considered battery internal components of the battery pack 18. Although an example placement of the battery arrays 20 is shown in FIG. 4, this particular placement is exemplary only and is therefore not intended to limit this disclosure. The battery internal components of the battery pack 18 can be arranged in any configuration inside the enclosure assembly 44.

In an embodiment, the enclosure assembly 44 is a sealed enclosure. The enclosure assembly 44 may include any size, shape, and configuration within the scope of this disclosure. The enclosure assembly 44 may include a tray 46 and a cover 48. The tray 46 and the cover 48 cooperate to surround and enclose the battery arrays 20. The tray 46 may provide an open area 50 for holding the battery arrays 20. After positioning the battery arrays 20 within the open area 50, the cover 48 may be seated and sealed to the tray 46 to enclose the battery arrays 20 therein.

In an embodiment, the enclosure assembly 44 is a metallic-based component. For example, the tray 46 and the cover 48 could be constructed out of aluminum or steel. However, other materials, including polymer-based materials, may also be suitable for constructing the components of the enclosure assembly 44.

Figure 5:
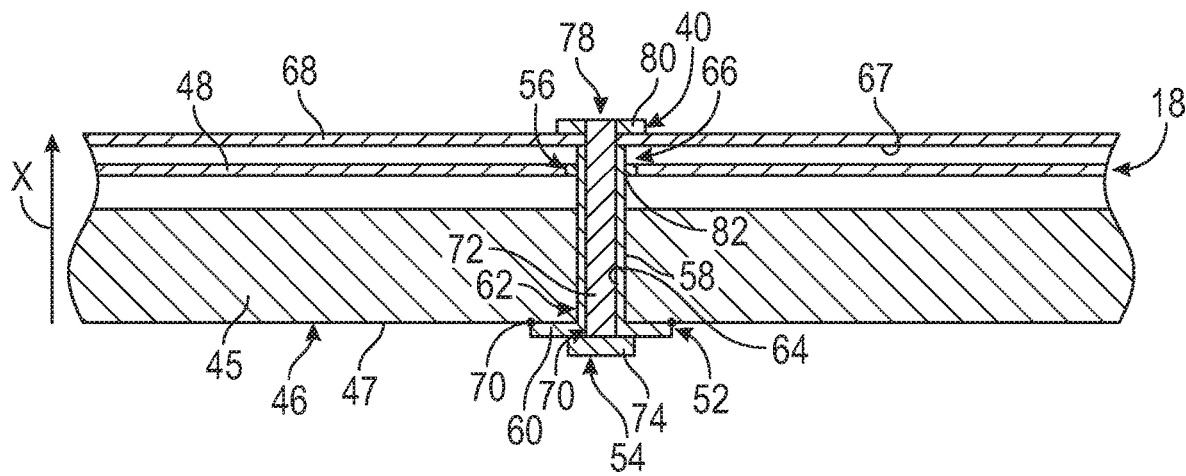
FIG. 5 is a cross-sectional view through section 5-5 of FIG. 2 and illustrates an exemplary attachment and sealing assembly of the battery pack.

FIG. 5, with continued reference to FIGS. 1-4, illustrates an exemplary attachment and sealing assembly 40 for establishing a mid-span attachment point of the battery pack 18. The exemplary attachment and sealing assembly 40 may include a pass-through component 52, a fastener 54 received by the pass-through component 52, and a seal 56. These components and their respective designs and functions are described in greater detail below.

The pass-through component 52 may extend through a bottom surface 47 of the tray 46, then through the battery internal structure 45, and then through the cover 48 of the battery pack 18. In an embodiment, the pass-through component 52 is configured as a sleeve that includes a tube 58 and a flange 60 that protrudes radially outwardly from a first end 62 of the tube 58. The tube 58 may include a hollow passage 64 that extends from the first end 62 to a second end 66.

In a mounted position of the pass-through component 52, the flange 60 may abut against the bottom surface 47 of the tray 46, and the second end 66 of the tube 58 may abut against an undersurface 67 of a vehicle body component 68 of the vehicle frame 28. The vehicle body component 68 may be the floor pan 26, one of the rails 34, one of the cross members 36, or any of other component of the vehicle frame 28.

In an embodiment, the flange 60 of the tube 58 is secured to the bottom surface 47 of the tray 46 by a sealant 70. The sealant 70, which is shown schematically, may be a weld bead, a body sealer, an e-coating, etc. The sealant 70 may extend around an entire circumference of the flange 60 at an interface between the flange 60 and the bottom surface 47.

The fastener 54 may be received through the hollow passage 64 of the tube 58 of the pass-through component 52. In an embodiment, the fastener 54 is configured as a bolt that includes a stud 72 and a head 74 that protrudes radially outwardly from the stud 72 at a first end 76 of the stud 72.

The fastener 54 may be inserted through the hollow passage 64 of the tube 58 using a bottom-up approach (i.e., in a direction X that extends from the bottom surface 47 of the tray 46 toward the vehicle body component 68). Therefore, in a mounted position, the head 74 of the fastener 54 may be received in abutting engagement with the flange 60 of the tube 58 of the pass-through component 52, and a second end 78 of the stud 72 may extend through the vehicle body component 68. A nut 80, such as a weld nut, for example, may be positioned over the second end 78 of the stud 72 in order to secure the fastener 54 relative to the pass-through component 52. Once the nut 80 is secured in place, the attachment and sealing assembly 40, and thus the battery pack 18, is secured relative to the vehicle frame 28.

The seal 56 may be positioned within a hole or opening 82 formed through the cover 48. The seal 56 is therefore configured to radially seal to the outside of the tube 58 of the pass-through component 52 at the location where the tube 58 passes through the cover 48. The seal 56 substantially prevents the ingress of water, dirt, or other unwanted debris from entering inside the battery pack 18 through the opening 82. The inside of the pass-through component 52 does not require sealing since it does not interface with the battery internal components.

Figure 6:
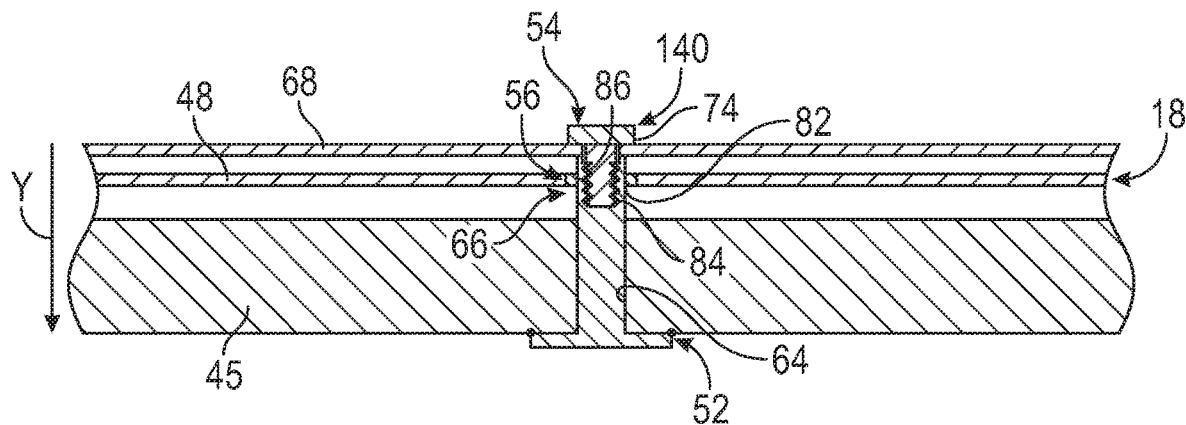
FIG. 6 illustrates an attachment and sealing assembly according to another embodiment of this disclosure.

FIG. 6, with continued reference to FIGS. 1-4, illustrates another exemplary attachment and sealing assembly 140 for establishing a mid-span attachment point of the battery pack 18. The exemplary attachment and sealing assembly 140 is similar to the assembly 40 of FIG. 5 and may include a pass-through component 52, a fastener 54 received by the pass-through component 52, and a seal 56. In this embodiment, the hollow passage 64 of the tube 58 of the pass-through component 52 may include a threaded portion 84 located near the second end 66 of the tube 58. The fastener 54 may include corresponding threads 86 that may engage the threaded portion 84 for securing the fastener 54 to the pass-through component 52.

The fastener 54 may be inserted into the pass-through component 52 of the attachment and sealing assembly 140 using a top-down approach (i.e., in a direction that extends from the vehicle body component 68 toward the bottom surface 47 of the tray 46). Therefore, in a mounted position, a head 74 of the fastener 54 may be received in abutting engagement with the vehicle body component 68, and the threads 86 may be screwed into the threaded portion 84 of the tube 58 to secure the fastener 54 relative to the pass-through component 52. A separate nut is not required for securing the fastener 54 and the pass-through component 52 together in this embodiment.

In this embodiment, the seal 56 may likewise be positioned within a hole or opening 82 formed through the cover 48. The seal 56 is therefore configured to radially seal to the outside of the tube 58 of the pass-through component 52 at the location where the tube 58 passes through the cover 48.

Figure 7:
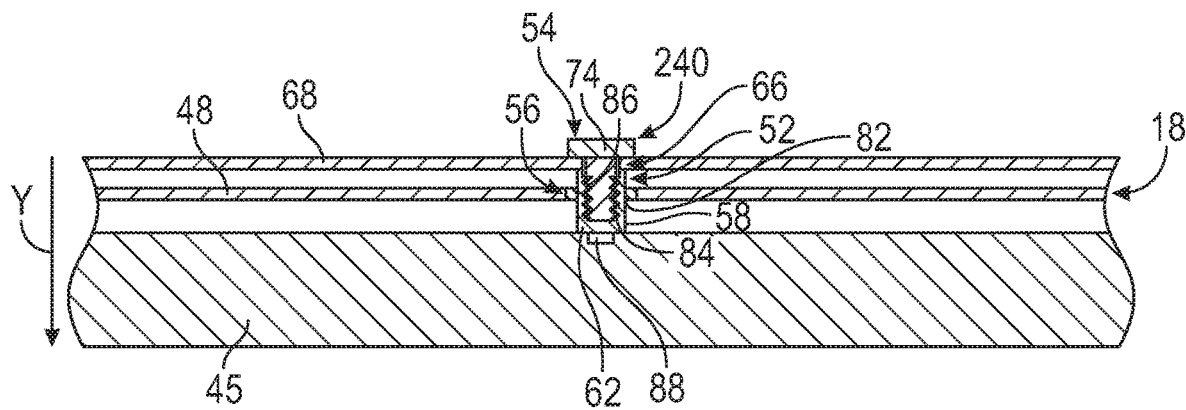
FIG. 7 illustrates an attachment and sealing assembly according to yet another embodiment of this disclosure.

FIG. 7, with continued reference to FIGS. 1-4, illustrates yet another exemplary attachment and sealing assembly 240 for establishing a mid-span attachment point of the battery pack 18. The exemplary attachment and sealing assembly 240 may include a pass-through component 52, a fastener 54 received by the pass-through component 52, and a seal 56. The pass-through component 52 of the attachment and sealing assembly 240 may extend through the cover 48 and then into a portion of the battery internal structure 45. In an embodiment, the pass-through component 52 includes a tube 58 and a threaded stanchion 88 that protrudes from a first end 62 of the tube 58. The tube 58 may include a second end 66 that includes a threaded portion 84 for threadably engaging threads 86 of the fastener 54.

In a mounted position of the pass-through component 52, the threaded stanchion 88 may extend into the battery internal structure 45, and the second end 66 of the tube 58 may abut against the vehicle body component 68.

The fastener 54 may be inserted into the pass-through component 52 of the attachment and sealing assembly 240 using a top-down approach (i.e., in a direction Y that extends from the vehicle body component 68 toward the bottom surface 47 of the tray 46). Therefore, in a mounted position, a head 74 of the fastener 54 may be received in abutting engagement with the vehicle body component 68, and the threads 86 may be screwed into the threaded portion 84 of the tube 58 to secure the fastener 54 relative to the pass-through component 52. A separate nut is not required for securing the fastener 54 and the pass-through component 52 together in this embodiment.

The seal 56 may be positioned within a hole or opening 82 formed through the cover 48. The seal 56 is therefore configured to radially seal to the outside of the tube 58 of the pass-through component 52 at the location where the tube 58 passes through the cover 48.

FIGS. 8-10 illustrate exemplary designs of the seal 56 of the attachment and sealing assemblies 40, 140, 240 described above. The seal 56 of FIGS. 8-9 may be secured to the cover 48 of the battery pack 18 using an adhesive/sealant 90, and the seal 56 of FIG. 10 may be press fit within the opening 82 of the cover 48. Other attachment methodologies, including but not limited to over-molding, are also contemplated within the scope of this disclosure.

Referring first to FIGS. 8-9, the seal 56 may include an annular body 92 and a flange 94 that protrudes radially outwardly from the annular body 92. When received within the opening 82 of the cover 48, the annular body 92 may extend within an inner diameter 95 of the opening 82, and the flange 94 may be seated against an exterior surface 96 of the cover 48. The adhesive/sealant 90 may be applied between the inner diameter 95 and the annular body 92 and between the exterior surface 96 and the flange 94.

In an embodiment, the adhesive/sealant 90 is a pressure sensitive adhesive. However, other adhesives and sealants are further contemplated within the scope of this disclosure.

A passage 97 may be formed through the seal 56. An inner diameter wall 98 of the annular body 92 may circumscribe the passage 97. One more lips or wipers 99 may protrude inwardly from the inner diameter wall 98. The lips/wipers 99 are configured to seal radially to the tube 58 of the pass-through component 52 (see FIG. 9), thereby preventing the ingress of unwanted moisture and debris inside the battery pack 18.

The lips/wipers 99 of the seal 56 may be made of rubber or some other compliant material and are configured to flex and tolerate manufacturing variations of the cover 48 and the pass-through component 52. The seal 56 therefore may be oriented to enable easy installation of the attachment and sealing assemblies of this disclosure.

Referring now to the embodiment of FIG. 10, the seal 56 may include an annular body 92 that excludes the flange 94 of FIG. 8. The seal 56 may include one or more lips/wipers 99 for radially sealing to the pass-through component 52. In this embodiment, the annular body 92 may be press-fit within the opening 82 of the cover 48. A shoulder 85 of the cover 48 may prevent the over-insertion of the seal 56.

The attachment and sealing assemblies of this disclosure enable simple and cost effective mounting solutions for establishing mid-span battery pack attachment points. The unique attachment and sealing strategies discussed herein may employ either a bottom-up or top-down approach and therefore enable mounting flexibility across multiple manufacturing platforms.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly;
a battery array housed inside the enclosure assembly;
a battery internal structure adjacent to the battery array; and
an attachment and sealing assembly including:
a pass-through component extending at least partially through the battery internal structure and through an opening formed through a portion of the enclosure assembly;
a fastener received by the pass-through component; and
a seal arranged between the pass-through component and the portion of the enclosure assembly.

2. The battery pack as recited in claim 1, wherein the attachment and sealing assembly establishes a mid-span attachment point of the battery pack, and further comprising an attachment assembly that establishes a peripheral attachment point of the battery pack.

3. A battery pack, comprising:
an enclosure assembly;
a battery array housed inside the enclosure assembly;
a battery internal structure adjacent to the battery array; and
an attachment and sealing assembly including:
a pass-through component extending at least partially through the battery internal structure and through a portion of the enclosure assembly;
a fastener received by the pass-through component; and
a seal arranged between the pass-through component and the portion of the enclosure assembly,
wherein the pass-through component extends through a bottom surface of a tray of the enclosure assembly, then through the battery internal structure, and then through a cover of the enclosure assembly.

4. The battery pack as recited in claim 3, wherein a flange of the pass-through component abuts against the bottom surface of the tray and an end of a tube of the pass-through component abuts against an undersurface of the cover.

5. The battery pack as recited in claim 4, wherein the fastener is received through a hollow passage of the tube such that a head of the fastener abuts against the flange of the pass-through component and a stud of the fastener extends through a vehicle body component.

6. The battery pack as recited in claim 5, comprising a nut secured to an end of the stud.

7. The battery pack as recited in claim 1, wherein a thread of the fastener is received by a threaded portion of the pass-through component.

8. The battery pack as recited in claim 7, wherein a head of the fastener is received against a vehicle body component.

9. The battery pack as recited in claim 1, wherein the pass-through component includes a tube that extends through a cover of the enclosure assembly and a threaded stanchion that extends into the battery internal structure.

10. The battery pack as recited in claim 9, wherein a thread of the fastener engages a threaded portion of the tube.

11. The battery pack as recited in claim 1, wherein the seal includes a passage and an inner diameter wall that circumscribes the passage, wherein at least one lip or wiper protrudes inwardly from the inner diameter wall and radially seals to the pass-through component.

12. An electrified vehicle, comprising:
a vehicle body component;
a battery pack mounted to the vehicle body component; and
an attachment and sealing assembly that establishes a mid-span connection point for connecting the battery pack to the vehicle body component,
wherein the attachment and sealing assembly includes a pass-through component that extends through an opening formed through a portion of an enclosure assembly of the battery pack and at least partially into a battery internal structure of the battery pack.

13. The electrified vehicle as recited in claim 12, comprising an attachment assembly for establishing a peripheral connection point of the battery pack.

14. The electrified vehicle as recited in claim 12, wherein the pass-through component is a sleeve that includes a tube and a flange.

15. The electrified vehicle as recited in claim 12, wherein the pass-through component includes a tube and a threaded stanchion that is attached to the battery internal structure.

16. The electrified vehicle as recited in claim 12, wherein the vehicle body component is a floor pan or a rail of a vehicle frame.

17. The electrified vehicle as recited in claim 12, wherein the pass-through component extends through a cover of the battery pack.

18. The electrified vehicle as recited in claim 17, comprising a seal that radially seals to a tube of the pass-through component.

19. The electrified vehicle as recited in claim 12, comprising a fastener that extends at least partially through the pass-through component.

20. The electrified vehicle as recited in claim 12, wherein the battery internal structure is a cross member arranged between a first battery array and a second battery array at a location inside the battery pack.

* * * * *